United States Patent
Hirakawa et al.

(10) Patent No.: US 8,223,417 B2
(45) Date of Patent: Jul. 17, 2012

(54) OPTICAL SCANNING DEVICE AND IMAGE FORMING APPARATUS

(75) Inventors: Makoto Hirakawa, Kanagawa (JP); Yoshinori Hayashi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 460 days.

(21) Appl. No.: 12/415,405

(22) Filed: Mar. 31, 2009

(65) Prior Publication Data

US 2009/0251753 A1 Oct. 8, 2009

(30) Foreign Application Priority Data

Apr. 3, 2008 (JP) ................................. 2008-097557
Jan. 20, 2009 (JP) ................................. 2009-010303

(51) Int. Cl.
*G02B 26/08* (2006.01)

(52) U.S. Cl. .................. 359/204.5; 359/207.7; 359/474; 359/475; 359/476

(58) Field of Classification Search ............... 359/201.1, 359/204.1, 204.5, 207.7, 565, 574–576; 347/241, 347/256

See application file for complete search history.

(56) References Cited

U.S. PATENT DOCUMENTS

| | | | |
|---|---|---|---|
| 5,557,448 A | 9/1996 | Endo et al. | |
| 5,570,224 A | 10/1996 | Endo et al. | |
| 5,581,392 A | 12/1996 | Hayashi | |
| 5,589,982 A * | 12/1996 | Faklis et al. | 359/565 |
| 5,652,670 A | 7/1997 | Hayashi | |
| 5,875,051 A | 2/1999 | Suzuki et al. | |
| 6,069,724 A | 5/2000 | Hayashi et al. | |
| 6,081,386 A | 6/2000 | Hayashi et al. | |
| 6,104,522 A | 8/2000 | Hayashi et al. | |
| 6,185,026 B1 | 2/2001 | Hayashi et al. | |
| 6,198,562 B1 | 3/2001 | Hayashi et al. | |
| 6,369,927 B2 | 4/2002 | Hayashi | |
| 6,400,391 B1 | 6/2002 | Suhara et al. | |
| 6,462,853 B2 | 10/2002 | Hayashi | |
| 6,466,351 B1 * | 10/2002 | Iizuka et al. | 359/209.1 |
| 6,469,818 B1 * | 10/2002 | Kato | 359/204.1 |
| 6,587,245 B2 | 7/2003 | Hayashi | |
| 6,657,765 B2 | 12/2003 | Hayashi et al. | |
| 6,757,089 B2 | 6/2004 | Hayashi | |
| 6,768,506 B2 | 7/2004 | Hayashi et al. | |
| 6,771,296 B2 | 8/2004 | Hayashi et al. | |
| 6,771,407 B2 | 8/2004 | Hayashi et al. | |
| 6,788,444 B2 | 9/2004 | Suzuki et al. | |
| 6,803,941 B2 | 10/2004 | Hayashi et al. | |

(Continued)

FOREIGN PATENT DOCUMENTS

JP 2002-287062 10/2002

(Continued)

OTHER PUBLICATIONS

U.S. Appl. No. 09/031,410, filed Feb. 26, 1998, Kohji Sakai.

(Continued)

*Primary Examiner* — Frank Font

(74) *Attorney, Agent, or Firm* — Oblon, Spivak, McClelland, Maier & Neustadt, L.L.P.

(57) ABSTRACT

An optical scanning device includes a diffractive optical element. The diffractive optical element is a hybrid lens in which a resin layer is joined to a glass-lens base material, and a diffractive surface is provided in the resin layer. The diffractive surface has a multi-step structure including a plurality of zonal surfaces and a plurality of step surfaces.

11 Claims, 6 Drawing Sheets

U.S. PATENT DOCUMENTS

| | | |
|---|---|---|
| 6,804,064 B2 | 10/2004 | Hirakawa |
| 6,829,102 B2 | 12/2004 | Ohashi et al. |
| 6,903,856 B2 | 6/2005 | Hayashi |
| 6,906,739 B2 | 6/2005 | Suzuki et al. |
| 6,934,061 B2 | 8/2005 | Ono et al. |
| 6,956,685 B2 | 10/2005 | Hayashi |
| 6,987,593 B2 | 1/2006 | Hayashi et al. |
| 7,006,120 B2 | 2/2006 | Sakai et al. |
| 7,050,210 B2 | 5/2006 | Atsuumi et al. |
| 7,068,296 B2 | 6/2006 | Hayashi et al. |
| 7,088,484 B2 | 8/2006 | Hayashi et al. |
| 7,106,483 B2 | 9/2006 | Hayashi et al. |
| 7,145,705 B2 | 12/2006 | Hayashi |
| 7,218,432 B2 | 5/2007 | Ichii et al. |
| 7,236,281 B2 | 6/2007 | Hayashi et al. |
| 7,253,937 B2 | 8/2007 | Ueda et al. |
| 7,271,823 B2 | 9/2007 | Izumi et al. |
| 7,271,824 B2 | 9/2007 | Omori et al. |
| 7,362,486 B2 | 4/2008 | Hayashi et al. |
| 7,385,181 B2 | 6/2008 | Miyatake et al. |
| 7,417,777 B2 | 8/2008 | Saisho et al. |
| 7,443,558 B2 | 10/2008 | Sakai et al. |
| 7,471,434 B2 | 12/2008 | Nakamura et al. |
| 7,495,813 B2 | 2/2009 | Akiyama et al. |
| 7,649,663 B2 * | 1/2010 | Shiraishi .................... 359/204.1 |
| 2003/0053156 A1 | 3/2003 | Satoh et al. |
| 2003/0071203 A1 | 4/2003 | Inagaki |
| 2003/0174374 A1 * | 9/2003 | Takeuchi ...................... 359/205 |
| 2004/0036936 A1 | 2/2004 | Nakajima et al. |
| 2005/0243396 A1 | 11/2005 | Fujii et al. |
| 2006/0232659 A1 | 10/2006 | Hayashi et al. |
| 2006/0284968 A1 | 12/2006 | Hayashi et al. |
| 2007/0002417 A1 | 1/2007 | Hirakawa et al. |
| 2007/0030538 A1 | 2/2007 | Hirakawa et al. |
| 2007/0058255 A1 | 3/2007 | Imai et al. |
| 2007/0253047 A1 * | 11/2007 | Ichii et al. ..................... 359/204 |
| 2007/0253048 A1 | 11/2007 | Sakai et al. |
| 2007/0285781 A1 * | 12/2007 | Seki et al. ..................... 359/566 |
| 2007/0297036 A1 | 12/2007 | Nakamura et al. |
| 2008/0024849 A1 | 1/2008 | Hayashi et al. |
| 2008/0025759 A1 | 1/2008 | Ichii et al. |
| 2008/0055692 A1 * | 3/2008 | Saisho et al. .................. 359/205 |
| 2008/0062491 A1 | 3/2008 | Nakamura et al. |
| 2008/0068689 A1 * | 3/2008 | Saisho et al. .................. 359/204 |
| 2008/0068693 A1 | 3/2008 | Hayashi et al. |
| 2008/0100895 A1 | 5/2008 | Hayashi et al. |
| 2008/0123159 A1 | 5/2008 | Hayashi et al. |
| 2008/0180772 A1 | 7/2008 | Miyatake et al. |
| 2008/0192319 A1 | 8/2008 | Miyatake et al. |
| 2008/0204840 A1 | 8/2008 | Watanabe et al. |
| 2008/0204841 A1 | 8/2008 | Suzuki et al. |
| 2008/0204842 A1 | 8/2008 | Arai et al. |
| 2008/0212999 A1 | 9/2008 | Masuda et al. |
| 2008/0218827 A1 | 9/2008 | Watanabe et al. |
| 2008/0219601 A1 | 9/2008 | Arai et al. |
| 2008/0266633 A1 | 10/2008 | Hirakawa et al. |
| 2008/0267662 A1 | 10/2008 | Arai et al. |
| 2008/0267663 A1 | 10/2008 | Ichii et al. |
| 2008/0284838 A1 | 11/2008 | Suzuki et al. |
| 2008/0285104 A1 | 11/2008 | Arai et al. |
| 2009/0052944 A1 | 2/2009 | Kubo et al. |
| 2009/0060582 A1 | 3/2009 | Ichii et al. |
| 2009/0060583 A1 | 3/2009 | Amada et al. |

FOREIGN PATENT DOCUMENTS

| | | |
|---|---|---|
| JP | 2003-241127 | 8/2003 |
| JP | 2006-154701 | 6/2006 |
| JP | 2007-241182 | 9/2007 |

OTHER PUBLICATIONS

U.S. Appl. No. 12/027,628, filed Feb. 7, 2008, Makoto Hirakawa.

* cited by examiner

FIRST SURFACE + SECOND SURFACE ⇒ DIFFRACTIVE SURFACE

POWER CHANGE DUE TO CHANGE IN REFRACTIVE INDEX AND CHANGE IN SHAPE OF LENS CAUSED BY TEMPERATURE CHANGE →

POWER CHANGE DUE TO CHANGE IN OSCILLATION WAVELENGTH OF LASER DIODE CAUSED BY TEMPERATURE CHANGE →

← POWER CHANGE OF DIFFRACTIVE OPTICAL ELEMENT CAUSED BY TEMPERATURE CHANGE

DIFFRACTIVE SURFACE

DIFFRACTIVE SURFACE

LIGHT SOURCE

DIFFRACTIVE SURFACE

LIGHT SOURCE

DIFFRACTIVE SURFACE

FIG. 7A

RELATIONSHIP BETWEEN CURVATURE RADIUS AND NUMBER OF STEPS OF SECOND SURFACE IN MULTI-STEP DIFFRACTIVE SURFACE

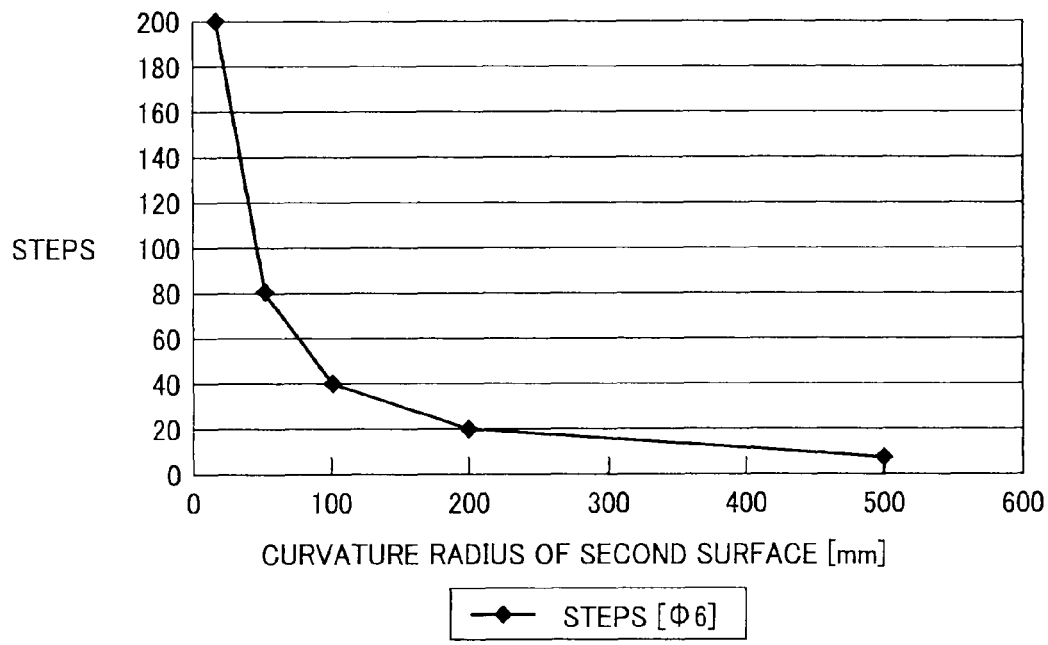

FIG. 7B

MAIN SCANNING DIRECTION

| CURVATURE RADIUS OF SECOND SURFACE [mm] | 200 | 350 | 400 | 500 |
|---|---|---|---|---|
| RATIO OF FOCUS FLUCTUATIONS DUE TO TEMPERATURE CHANGE | -0.68 | 0.04 | 0.16 | 0.33 |

FIG. 7C

SUB-SCANNING DIRECTION

| CURVATURE RADIUS OF SECOND SURFACE [mm] | 9 | 20 | 50 |
|---|---|---|---|
| RATIO OF FOCUS FLUCTUATIONS DUE TO TEMPERATURE CHANGE | 0.06 | 0.58 | 0.83 |

FIG. 7D

SUB-SCANNING DIRECTION (WAVELENGTH CHANGE)

| CURVATURE RADIUS OF SECOND SURFACE [mm] | 50 | 80 | 100 | 200 |
|---|---|---|---|---|
| RATIO OF FOCUS FLUCTUATIONS DUE TO WAVELENGTH CHANGE | -0.56 | 0.02 | 0.22 | 0.61 |

OPTICAL SCANNING DEVICE AND IMAGE FORMING APPARATUS

CROSS-REFERENCE TO RELATED APPLICATIONS

The present application claims priority to and incorporates by reference the entire contents of Japanese priority document 2008-097557 filed in Japan on Apr. 3, 2008 and Japanese priority document 2009-010303 filed in Japan on Jan. 20, 2009.

BACKGROUND OF THE INVENTION

1. Field of the Invention

The present invention relates to an optical scanning device in an image forming apparatus.

2. Description of the Related Art

Recently, cost reduction and high stability of image quality against temperature change are demanded of image forming apparatuses such as optical printers, digital copiers, and optical plotters.

Degradation of the image quality due to the temperature change is mainly caused by fluctuation of a beam waist position in a main-scanning direction and/or a sub-scanning direction arising from the temperature change. A change in volume of an optical element due to the temperature change and a change in oscillation wavelength of a laser diode due to the temperature change cause the fluctuation of the beam waist position in the main-scanning direction and/or the sub-scanning direction.

The change in oscillation wavelength of the laser diode is not always caused by the temperature change. It is known that the oscillation wavelength changes even when the temperature does not change. For example, chromatic aberration of an optical system used in an optical scanning device causes characteristic change. Therefore, high stability of image quality against the characteristic change is also demanded.

Japanese Patent Application Laid-open No. 2007-241182 proposes using a diffractive optical element that includes a multi-step diffractive surface, as an effective technology against degradation of image quality caused by the change in volume of an optical element and by the change in oscillation wavelength due to the temperature change and/or against degradation of image quality arising from the change in oscillation wavelength caused by any factor other than the temperature change. The diffractive surface is formed with a first surface having a diffraction effect and a second surface having a refraction effect which are joined to each other, and has characteristics that the power of the first surface and the power of the second surface are mutually cancelled out. By using the diffractive optical element, not only degradation of image quality due to the temperature change but also minimization of degradation of image quality due to the change in oscillation wavelength caused by any factor other than the temperature change can be achieved.

However, in a laser scanning device disclosed in Japanese Patent Application Laid-open No. 2007-241182, because the diffractive optical element having the multi-step diffractive surface is made of resin, a linear expansion coefficient of the diffractive optical element itself is $7.0 \times 10^{-5}$/K, which is comparatively large. Therefore, if a wide range of temperature change is assumed, a phase function coefficient in the diffractive optical element required to correct the fluctuation of the beam waist position in the main-scanning direction and/or the sub-scanning direction needs to be large, that is, the diffraction power needs to be increased. Besides, because the step of the multi-step diffractive surface needs to be increased, this causes machining to become difficult, and the diffractive surface may become susceptible to wavelength change which is independent of the temperature change.

SUMMARY OF THE INVENTION

It is an object of the present invention to at least partially solve the problems in the conventional technology.

According to an aspect of the present invention, there is provided an optical scanning device including a light source; a pre-deflector optical system that is arranged in an optical path of a light flux emitted from the light source and includes at least one diffractive optical element; a deflector that deflects the light flux passing through the pre-deflector optical system; and a scanning optical system that focuses the light flux deflected by the deflector on a surface to be scanned. The diffractive optical element is obtained by joining a resin layer to a glass-lens base material, a diffractive surface of the diffractive optical element has a multi-step structure including a plurality of zonal surfaces substantially perpendicular to an optical axis and a plurality of step surfaces, and the diffractive surface is formed in the resin layer.

According to another aspect of the present invention, there is provided an image forming apparatus including at least one image carrier; and at least one above optical scanning device to scan the image carrier with a light flux to form an image on the image carrier.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 7A to 7D are diagrams for explaining a relationship between a curvature radius of a second surface and the number of steps in a multi-step diffractive surface according to a second embodiment of the present invention.

DETAILED DESCRIPTION OF THE PREFERRED EMBODIMENTS

Exemplary embodiments of the present invention are explained in detail below with reference to the accompanying drawings.

Figure 1:
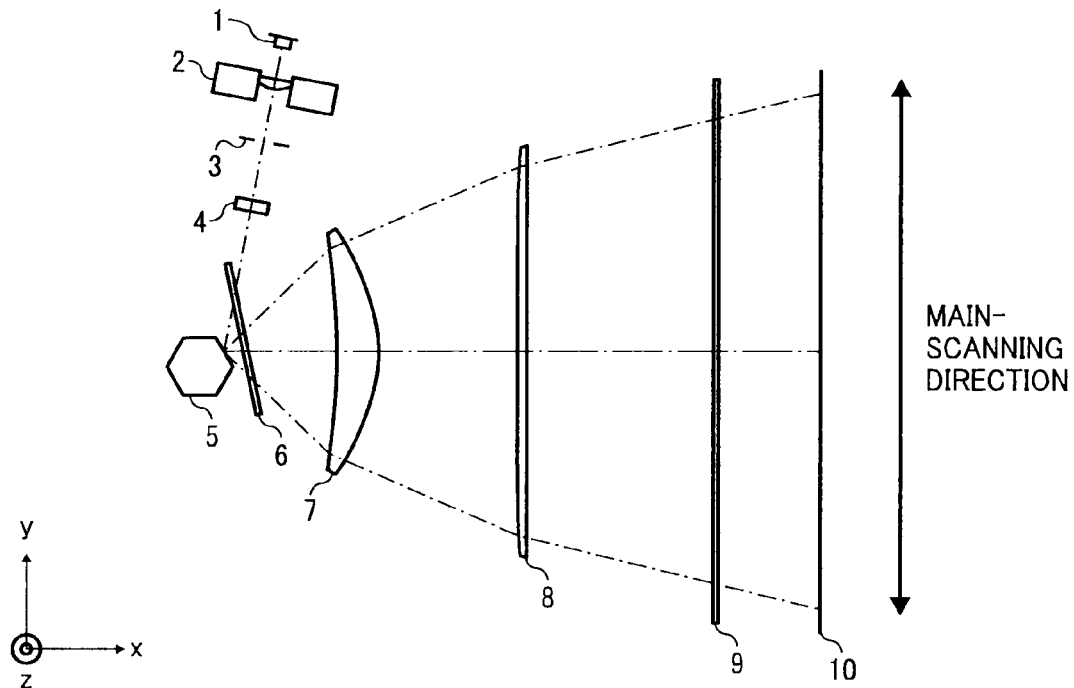
FIG. 1 is a schematic top view of an optical scanning device according to a first embodiment of the present invention.

FIG. 1 represents an example of optical arrangement of an optical scanning device according to a first embodiment of the present invention. The optical scanning device includes a laser diode (LD) 1 as a light source, a coupling lens 2, an aperture member 3, a linear-image forming lens 4, a rotating polygon mirror 5 as an optical deflector, a soundproof glass 6 as a window of a soundproof housing (not shown) that houses the polygon mirror 5, scanning optical members (scanning lenses) 7 and 8, and a dustproof glass 9 as a part of a housing that houses the optical system in FIG. 1 and prevents entry of dust into the housing. The optical scanning device scans a surface to be scanned 10.

A divergent light beam emitted from the laser diode 1 is converted into a substantially parallel light beam by the coupling lens 2. The parallel beam is beam-shaped by the aperture member 3 and then it is made to fall on the linear-image forming lens 4. The parallel light beam, after passing through the linear-image forming lens 4 and the soundproof glass 6, is converged in the sub-scanning direction as "a long linear image in the main-scanning direction" near a deflective-reflective facet of the polygon mirror 5. The converged light beam after being reflected from the deflective-reflective facet passes through the soundproof glass 6 enters the scanning optical members 7 and 8.

The light beam then passes through the dustproof glass 9 falls on the surface to be scanned 10 as a light spot. The scanning optical members 7 and 8 are, for example, lenses made of resin. An amount of expansion/contraction of resin lenses due to the temperature change is larger than glass lenses. However, because resin lenses can be made by injection molding, they can be fabricated with a specific surface of which profile is highly flexible. Therefore, resin lenses are becoming popular in scanning optical systems employed in recent image forming apparatuses with high image quality.

The polygon mirror 5 rotates at a constant speed and has a plurality of deflective-reflective facets. Therefore, when a light beam falls on the polygon mirror 5, it is reflected from one of the deflective-reflective facets and deflected at an equiangular speed. The scanning optical members 7 and 8 have such fθ characteristics that the light spot formed on the surface to be scanned 10 from the light beam that exits from the scanning optical members 7 and 8 moves at a constant speed in the main-scanning direction (y direction in FIG. 1) on the surface to be scanned 10. As the light spot moves on the surface to be scanned 10, it optically scans the surface to be scanned 10 at the constant speed.

The optical deflector 5 and the scanning optical members 7 and 8 have, for example, the specification shown in Table 1.

TABLE 1

| | $R_y$ [mm] | $R_z$ [mm] | X [mm] | n | Coefficient of Linear expansion |
|---|---|---|---|---|---|
| Deflective surface | — | — | 63.27 | — | — |
| Member 7 (first surface) | −279.876 | −61.000 | 22.59 | 1.5273 | $7.0 \times 10^{-5}$ |
| Member 7 (second surface) | −83.588 | — | 75.86 | — | — |
| Member 8 (first surface) | 6950.000 | 110.907 | 4.90 | 1.5273 | $7.0 \times 10^{-5}$ |
| Member 8 (second surface) | 765.951 | −68.224 | 158.72 | — | — |

In Table 1, entrance surface and exit surface of the scanning optical members are referred to as a first surface and a second surface respectively, $R_y$ represents paraxial curvature radius in the main-scanning direction, $R_z$ represents paraxial curvature radius in the sub-scanning direction, and X represents relative distance from an origin of each optical surface of the optical elements to an origin of an optical surface of a subsequent optical element.

Hereinafter, the scanning optical member 7 will be referred to as scanning lens 7 and the scanning optical member 8 will be referred to as scanning lens 8. Each of the first surface (entrance surface) of the scanning lens 7 and the first and second surfaces (entrance surface and exit surface) of the scanning lens 8 is a specific toroidal surface. The specific toroidal surface is a surface of which curvature in the sub-scanning direction changes according to a height of the lens in the main-scanning direction, and it can be expressed by following Equation (1) and Equation (2):

$$X(Y, Z) = \frac{\frac{Y^2}{R_y}}{1 + \sqrt{\left[1 - (1+K)\cdot\left(\frac{Y}{R_y}\right)^2\right]}} + A_4 \cdot Y^4 + A_6 \cdot Y^6 + \quad (1)$$

$$A_8 \cdot Y^8 + A_{10} \cdot Y^{10} + A_{12} \cdot Y^{12} + \frac{Cs(Y) \cdot Z^2}{1 + \sqrt{[1-(Cs(Y)\cdot Z)^2]}}$$

$$Cs(Y) = 1/R_z + B_1 \cdot Y + B_2 \cdot Y^2 + B_3 \cdot Y^3 + B_4 \cdot Y^4 + \quad (2)$$
$$B_5 \cdot Y^5 + B_6 \cdot Y^6 + B_7 \cdot Y^7 + B_8 \cdot Y^8 + B_9 \cdot Y^9 + B_{10} \cdot Y^{10}$$

Where X is a depth in an optical axis direction, $R_y$ a paraxial curvature radius in a direction corresponding to the main-scanning direction (i.e., y direction), $R_z$ is a paraxial curvature radius in a direction corresponding to the sub-scanning direction (i.e., z direction), Y is a distance in the direction corresponding to the main-scanning direction from the optical axis, Z is a distance in the direction corresponding to the sub-scanning direction from the optical axis, K is a conical constant, and $A_4, A_6, A_8, A_{10}, A_{12}, B_1, B_2, B_3, \ldots, B_{10}$ are coefficients.

The coefficients of the first surface (entrance surface) of the scanning lens 7 are given in Table 2.

TABLE 2

| $R_y$ | −279.876 | $R_z$ | −61.000 |
|---|---|---|---|
| K | 0 | $B_1$ | $-2.066 \times 10^{-6}$ |
| $A_4$ | $1.756 \times 10^{-7}$ | $B_2$ | $5.728 \times 10^{-6}$ |
| $A_6$ | $-5.492 \times 10^{-11}$ | $B_3$ | $3.152 \times 10^{-8}$ |
| $A_8$ | $1.088 \times 10^{-14}$ | $B_4$ | $2.280 \times 10^{-9}$ |
| $A_{10}$ | $-3.183 \times 10^{-19}$ | $B_5$ | $-3.730 \times 10^{-11}$ |
| $A_{12}$ | $-2.635 \times 10^{-24}$ | $B_6$ | $-3.283 \times 10^{-12}$ |
| | | $B_7$ | $1.766 \times 10^{-14}$ |
| | | $B_8$ | $1.373 \times 10^{-15}$ |
| | | $B_9$ | $-2.890 \times 10^{-18}$ |
| | | $B_{10}$ | $-1.985 \times 10^{-19}$ |

The coefficients of the first surface (entrance surface) of the scanning lens 8 are given in Table 3.

TABLE 3

| $R_y$ | 6950.000 | $R_z$ | 110.907 |
|---|---|---|---|
| K | 0 | $B_1$ | $-9.594 \times 10^{-7}$ |
| $A_4$ | $1.550 \times 10^{-8}$ | $B_2$ | $-2.135 \times 10^{-7}$ |
| $A_6$ | $1.293 \times 10^{-14}$ | $B_3$ | $-8.080 \times 10^{-12}$ |
| $A_8$ | $-8.811 \times 10^{-18}$ | $B_4$ | $2.391 \times 10^{-12}$ |
| $A_{10}$ | $-9.182 \times 10^{-22}$ | $B_5$ | $2.881 \times 10^{-14}$ |
| $A_{12}$ | 0 | $B_6$ | $3.694 \times 10^{-15}$ |
| | | $B_7$ | $-3.259 \times 10^{-18}$ |

TABLE 3-continued

| | |
|---|---|
| $B_8$ | $1.814 \times 10^{-20}$ |
| $B_9$ | $8.722 \times 10^{-23}$ |
| $B_{10}$ | $-1.341 \times 10^{-23}$ |

The coefficients of the second surface (exit surface) of the scanning lens 8 are given in Table 4.

TABLE 4

| | | | |
|---|---|---|---|
| $R_y$ | 765.951 | $R_z$ | −68.224 |
| K | 0 | $B_1$ | 0 |
| $A_4$ | $-1.150 \times 10^{-7}$ | $B_2$ | $3.644 \times 10^{-7}$ |
| $A_6$ | $1.097 \times 10^{-11}$ | $B_3$ | 0 |
| $A_8$ | $-6.542 \times 10^{-16}$ | $B_4$ | $-4.847 \times 10^{-13}$ |
| $A_{10}$ | $1.984 \times 10^{-20}$ | $B_5$ | 0 |
| $A_{12}$ | $-2.412 \times 10^{-25}$ | $B_6$ | $-1.666 \times 10^{-16}$ |
| | | $B_7$ | 0 |
| | | $B_8$ | $4.535 \times 10^{-19}$ |
| | | $B_9$ | 0 |
| | | $B_{10}$ | $-2.819 \times 10^{-23}$ |

The second surface (exit surface) of the scanning lens 7 is a rotationally symmetric aspherical surface. The aspherical surface used here is expressed by following Equation (3) where C is an inverse number (paraxial curvature) to a paraxial curvature radius and H is a height from the optical axis.

$$X(H) = \frac{C \cdot H^2}{1 + \sqrt{1 - (1+K) \cdot C^2 \cdot H^2}} + A_4 \cdot H^4 + A_6 \cdot H^6 + A_8 \cdot H^8 + A_{10} \cdot H^{10} + A_{12} \cdot H^{12} \quad (3)$$

The coefficients of the second surface (exit surface) of the scanning lens 7 are given in Table 5.

TABLE 5

| | |
|---|---|
| $R_y$ | −83.588 |
| K | $-5.492 \times 10^{-1}$ |
| $A_4$ | $2.748 \times 10^{-7}$ |
| $A_6$ | $-4.502 \times 10^{-12}$ |
| $A_8$ | $-7.366 \times 10^{-15}$ |
| $A_{10}$ | $1.803 \times 10^{-18}$ |
| $A_{12}$ | $2.728 \times 10^{-23}$ |

The laser diode (light source) 1 is an edge-emitting type laser (edge emitting laser) in which a designed oscillation wavelength is 655 nanometers. Although one light source is shown in FIG. 1, the number of light sources can be two or more. Besides, the laser diode is not limited to the edge-emitting laser, i.e., it may be a vertical-cavity surface-emitting laser (VCSEL) array having a plurality of light emitting portions.

The coupling lens 2 is placed in a light path of a light flux from the light source 1. The divergent light flux emitted from the light source 1 is converted to a form of the light flux suitable for an optical system in the downstream of the coupling lens 2. The form of the light flux converted by the coupling lens 2 can be a parallel light flux, or can be a weak divergent or a weak convergent light flux.

The coupling lens 2 is a hybrid lens in which an ultraviolet curable resin layer is fixed to a glass-lens base material. A material of the glass-lens base material has such features as, at 25° C., a refractive index nd of d-line (wavelength λ=589 nanometers): nd=1.58313, an Abbe constant vd: vd=59.46, a refractive index n(655) at a wavelength λ=655 nanometers: n(655)=1.58021, and a refractive index n(655) at a wavelength λ=655 nanometers when temperature rises 20° C. from a reference temperature: n(655)=1.58028. A linear expansion coefficient of the glass-lens base material is 7.0×10⁻⁶. Meanwhile, a material of the resin layer has such features as, at 25° C., nd=1.52020, vd=52.02, n(655)=1.517246, and a linear expansion coefficient: 7.0×10⁻⁵. A center wall thickness of the resin layer is 0.05 millimeter.

The coupling lens 2 has a refractive surface in the glass-lens base material portion and a diffractive surface in the resin layer. The refractive surface has a rotationally symmetric aspherical shape. In the first embodiment, the diffractive surface is used for the entrance surface and the refractive surface is used for the exit surface.

Figure 2:
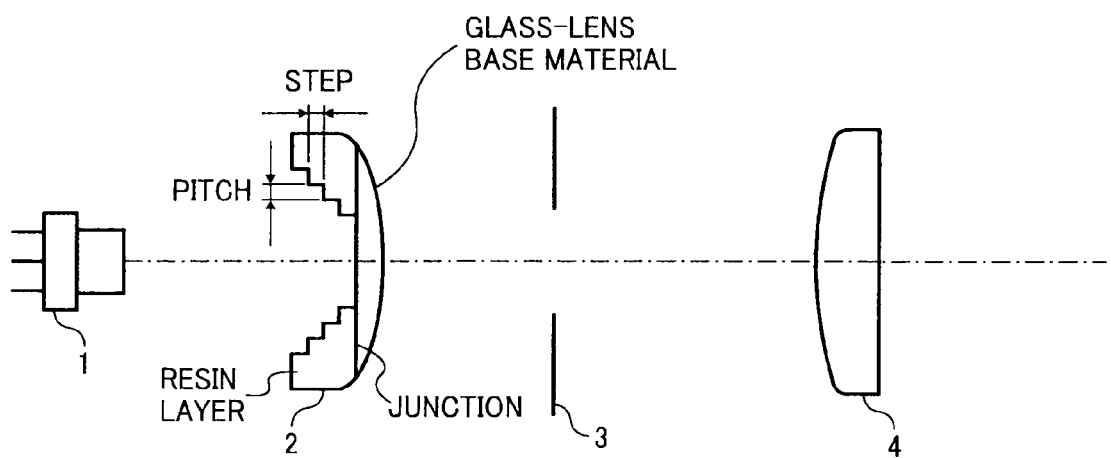
FIG. 2 is a schematic for explaining a coupling lens in FIG. 1.

As shown in FIG. 2, a junction between the ultraviolet curable resin layer and the glass-lens base material in the first embodiment is formed into a flat surface having no power. By forming the junction into the flat surface, it is possible to reduce an effect due to axial displacement between the glass-lens base material portion and the diffractive surface of the resin layer, and more easily manufacture the coupling lens 2.

Figures 3A, 3B:
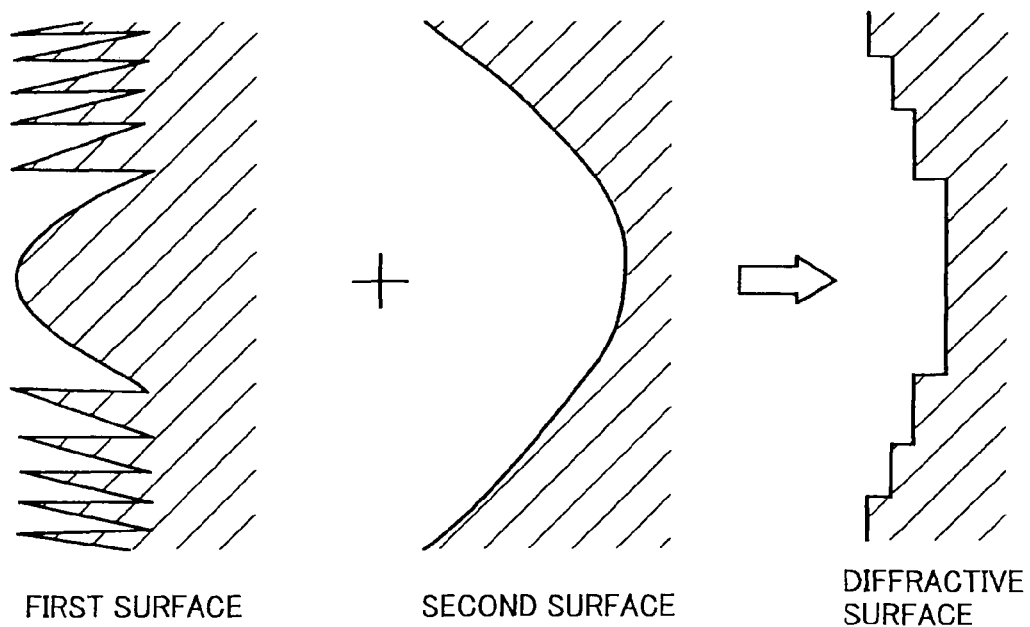
FIGS. 3A and 3B are schematics for explaining a diffractive surface of the coupling lens in FIG. 1.

In the coupling lens 2, the diffractive surface is used for the entrance surface. As shown in FIG. 3A, the diffractive surface includes a surface having a diffraction effect (hereinafter, also called "first surface") and a surface having a refraction effect (hereinafter, also called "second surface") which are joined to each other, and it is set so that the power of the first surface and the power of the second surface are mutually cancelled out. Therefore, the diffractive surface of the coupling lens 2 has no power in a geometrical-optics manner.

The diffractive surface of the coupling lens 2 has some surfaces that are almost perpendicular to the optical axis (hereafter, "zonal surfaces"), and has some surfaces that are not perpendicular to the optical axis (hereafter, "step surfaces"). The zonal surfaces and the step surfaces form steps on the diffractive surface of the coupling lens 2. These steps are arranged at a predetermined pitch. Specifically, a plurality of multi-step diffractive grooves are formed in the diffractive surface of the coupling lens 2. By forming the profile of the diffractive surface into a multi-step form as shown in FIG. 3A, an angle between a zonal surface and an adjacent step surface becomes a right angle, to obtain a step-like form symmetric with respect to the optical axis, so that ease of manufacture of a mold is further improved. The diffractive grooves according to the first embodiment are concentric, however, they may be elliptical.

An example of a manufacture method of the coupling lens 2 shown in FIG. 3A is explained below. First, the glass-lens base material and a mold for a diffractive surface profile are prepared. The ultraviolet curable resin is appropriately applied to the mold, and the mold is brought into tight contact with the glass-lens base material. Thereafter, ultraviolet is irradiated to the mold to cure the resin portion, and the diffractive surface profile is transferred. These processes allow the diffractive surface to be formed in the resin layer, to thereby manufacture the hybrid lens in which the ultraviolet curable resin layer is joined to the glass-lens base material.

Figure 4:
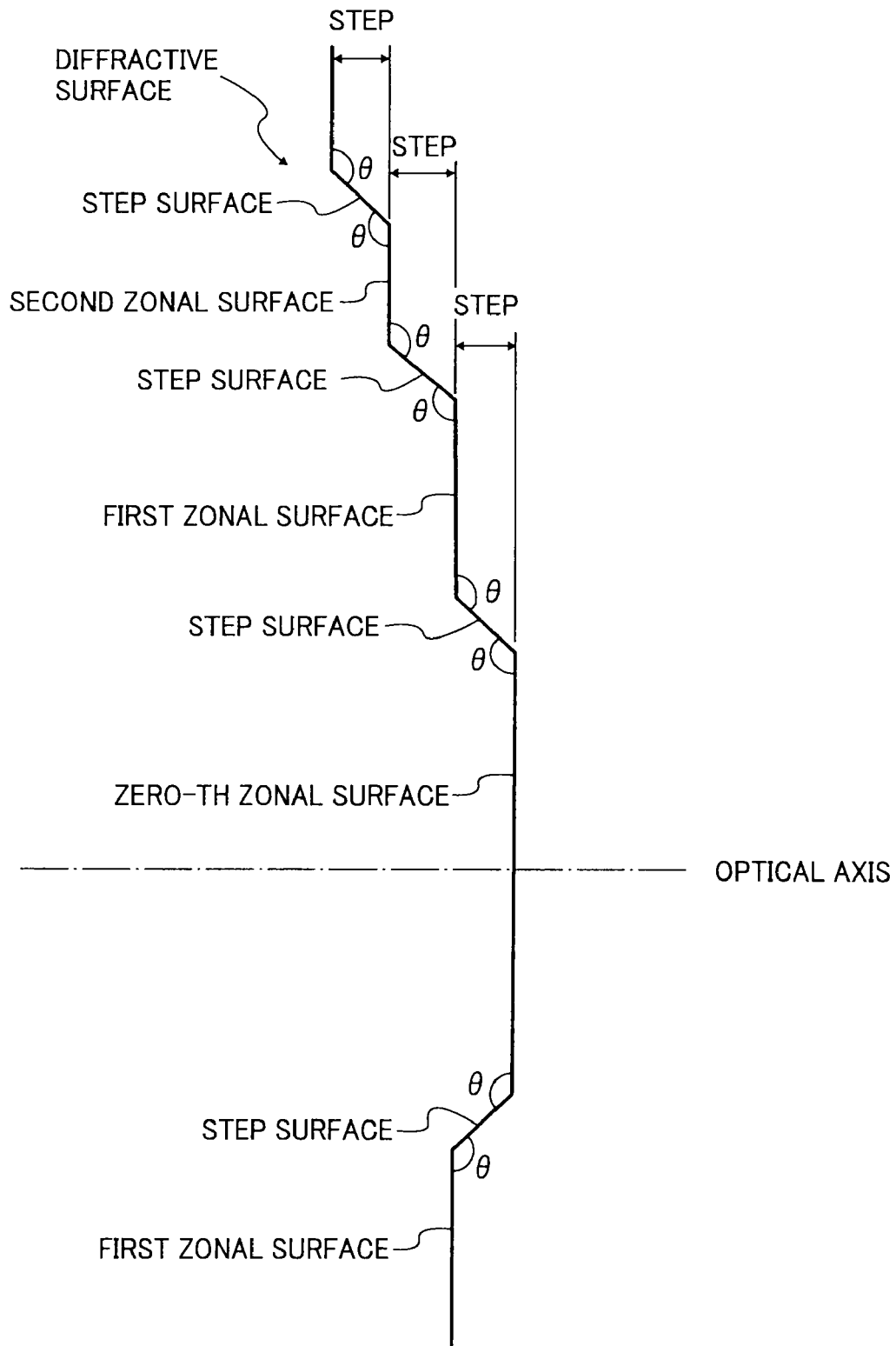
FIG. 4 is a schematic for explaining the diffractive surface of the coupling lens in FIG. 1.

As an example shown in FIG. 4, the first embodiment is configured so that an angle θ between a zonal surface and an adjacent step surface is an obtuse angle. Specifically, a step with a height of 1.135 micrometers is produced with respect to the optical axis direction between zonal surfaces, a width of the step surface is set to about 6 micrometers in the height direction and the angle θ is set to 165 degrees.

Thus, the angle θ is obtuse and a sufficient draft angle is provided. Therefore, a product can be easily extracted from the mold after being molded, and molding capability is thereby improved. It is preferable that θ is larger than 135 degrees and smaller than 170 degrees.

The multi-step diffractive surface is designed to compensate for temperature change. Therefore, fluctuation of an image location of the light beam converged on the surface to be scanned due to environment fluctuation and wavelength change is briefly explained below. First, factors that typically cause fluctuation of the image location due to the temperature change are considered as follows:

1. change in the refractive index itself of the lens caused by temperature change, 2. change in the shape of the lens caused by temperature change, and 3. change in the refractive index (chromatic aberration) of the lens due to the change in oscillation wavelength of the laser diode 1 caused by temperature change.

With regard to the change in the refractive index, the refractive index decreases as the temperature increases; because, the density decreases as the temperature increase. With regard to the change in the shape, the curvature of the lens surface decreases as the temperature increases; because, the lens expands as the temperature increase. With regard to the change in oscillation wavelength of the laser diode 1, the wavelength is displaced to a long wavelength side as the temperature increases. If the wavelength is displaced to the long wavelength side, the refractive index of the resin-made lens decreases.

Thus, the lens changes so that an absolute value of the power decreases with an increase in temperature irrespective of whether it is a positive lens or a negative lens. Meanwhile, because a diffraction angle is proportional to the wavelength, an absolute value of the power of the multi-step diffractive surface has a tendency that the absolute value increases with an increase of a wavelength irrespective of whether the power of the multi-step diffractive surface is positive or negative. Therefore, for example, when the synthesized power of the lens in the optical system of the optical scanning device is positive (or negative), by making the power of the multi-step diffractive surface positive (or negative), a power change caused by the temperature change of the lens can be cancelled out by a power change caused by the temperature change in the multi-step diffractive surface (see FIG. 3B).

As explained above, the power change caused by the temperature change of the lens can be cancelled out by designing the power change caused by the temperature change in the multi-step diffractive surface. However, fluctuation of an image location of the light beams converged on the surface to be scanned becomes a problem if there occurs a change in oscillation wavelength that is independent of the temperature change.

Therefore, a comparison is made in the following manner between a diffractive optical element (hereinafter, "hybrid lens") in which the resin layer is joined to the glass-lens base material used in the first embodiment and a diffractive optical element (hereinafter, "resin lens") manufactured using only resin when there occurs the change in oscillation wavelength that is independent of the temperature change. Both the hybrid lens and the resin lens have the multi-step diffractive surface to compensate for temperature, respectively.

Table 6 shows a phase function coefficient of the first surface and a curvature radius of the second surface in the hybrid lens and the resin lens to compensate for temperature.

TABLE 6

|  | Hybrid lens | Resin lens |
|---|---|---|
| Phase function coefficient of first surface | −0.0015189211 | −0.0064132222 |
| Curvature radius of second surface | −190 [mm] | −45 [mm] |

The phase function coefficient of the first surface is explained below. A phase function W(H) of the first surface is expressed by Equation (4) where H is a distance from the optical axis in a plane perpendicular to the optical axis, and $C_H$ represents a coefficient of the phase function. It is noted that a point on the optical axis is set as H=0.

$$W(H)=C_H \cdot H^2 \quad (4)$$

Table 7 shows an amount of change in the image location in the main-scanning direction when there occurs the change in oscillation wavelength of the laser diode 1 that is independent of the temperature change. In this case, the amount of change in the oscillation wavelength is 2 nanometers.

TABLE 7

|  | Hybrid lens | Resin lens |
|---|---|---|
| Change in oscillation wavelength of LD (2 [nm]) | −0.20 [mm] | −0.89 [mm] |

In the optical scanning device including the coupling lens 2 having the multi-step diffractive surface to compensate for temperature, when there occurs the change in the oscillation wavelength of the laser diode 1 that is independent of the temperature change, the amount of change in the image location is proportional to the diffraction power i.e. to the magnitude of the phase function coefficient of the first surface. When the aim is to perform temperature compensation, the magnitude of the phase function coefficient of the first surface in the hybrid lens is small as compared with the phase function coefficient of the resin lens (see Table 6). Therefore, when there occurs the change in the oscillation wavelength of the laser diode 1 that is independent of the temperature change, the amount of change in the image location in the main-scanning direction of the hybrid lens becomes very small as compared with that of the resin lens. Referring to Table 7, when the oscillation wavelength changes 2 nanometers, the image location of the resin lens changes 0.89 millimeter while that of the hybrid lens changes only 0.20 millimeter. Therefore, it is understood that robustness of the hybrid lens against the change in oscillation wavelength of the laser diode 1 that is independent of the temperature change is high as compared with that of the resin lens.

Recently, to meet a request for high-speed and high-density image forming apparatuses, it is proposed to use a multibeam light source including a plurality of light emitting portions. However, if the number of light emitting portions becomes large, image locations become different between beams due to fluctuation in each wavelength of the light emitting portions, which may cause degradation in images. Generally, the LD array has 2 channels (CHs) to 4 CHs while some of VCSELs exceed 40 beams, and thus, displacement of the image location due to wavelength fluctuation cannot be negligible.

Therefore, in the light source (e.g., LD array) having a plurality of light emitting portions, a comparison was made between amounts of changes of image locations in the main-scanning direction when there is a difference in wavelengths of beams emitted from the light emitting portions (wavelength deviation between CHs). The amount of change is shown in Table 8. In this case, a difference between wavelengths of beams emitted from the light emitting portions is 2 nanometers.

TABLE 8

|  | Hybrid lens | Resin lens |
|---|---|---|
| Wavelength deviation between CHs of LD (2 [nm]) | −0.20 [mm] | −0.89 [mm] |

When there is a difference in wavelengths emitted from a plurality of light sources (wavelength deviation between CHs) in the light sources, the amount of change of the image location in the main-scanning direction of the hybrid lens is significantly small as compared with that of the resin lens. Thus, by using the hybrid lens, it is possible to provide an optical system which is more resistant to wavelength fluctuation. The hybrid lens is particularly suitable for the light source such as the LD array having the light emitting portions. It is difficult to correct the displacement of the image location due to wavelength fluctuation between the light emitting portions by adjusting arranged positions of the optical elements, however, it is possible to reduce an effect of the displacement of the image location due to wavelength fluctuation by using the hybrid lens.

Figure 5A:
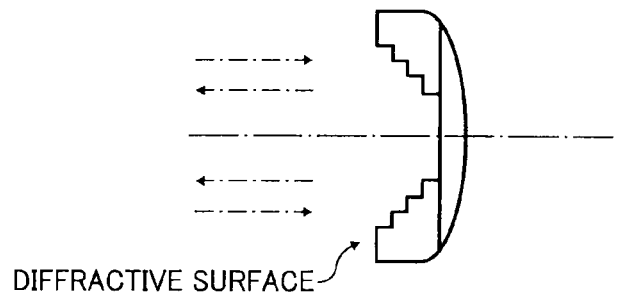
FIGS. 5A and 5B are schematics for explaining reflected light on the diffractive surface (part 1)
Figure 5B:
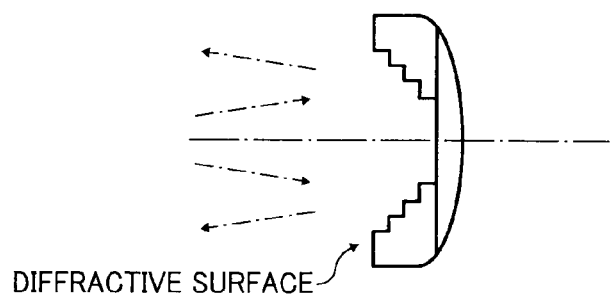

As shown in FIG. 5A, when parallel light enters the multi-step diffractive surface, the light reflected by the multi-step surface returns through the same optical path as that of the incident light because the multi-step diffractive surface has no power in a geometrical-optics manner. Meanwhile, as shown in FIG. 5B, when non-parallel light enters the multi-step diffractive surface, the light reflected by the multi-step diffractive surface becomes divergent light.

Figure 6A:
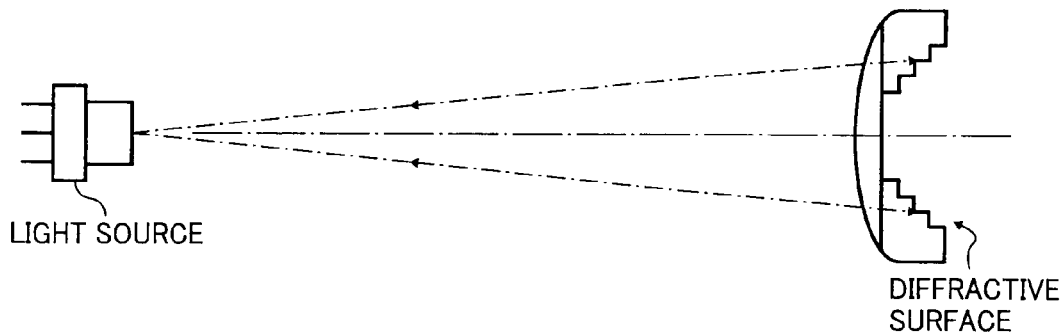
FIGS. 6A and 6B are schematics for explaining reflected light on the diffractive surface (part 2)

Therefore, as shown in FIG. 6A, as an example, if the multi-step diffractive surface is provided in the exit surface of the coupling lens 2, a light flux emitted from the light source 1 becomes already a parallel light flux before reaching the exit surface, and thus, the light reflected from the multi-step diffractive surface returns to the light source 1 through the same light path as that of the incident light. The return light makes an output in the light source 1 unstable, which causes image quality to be degraded.

Figure 6B:
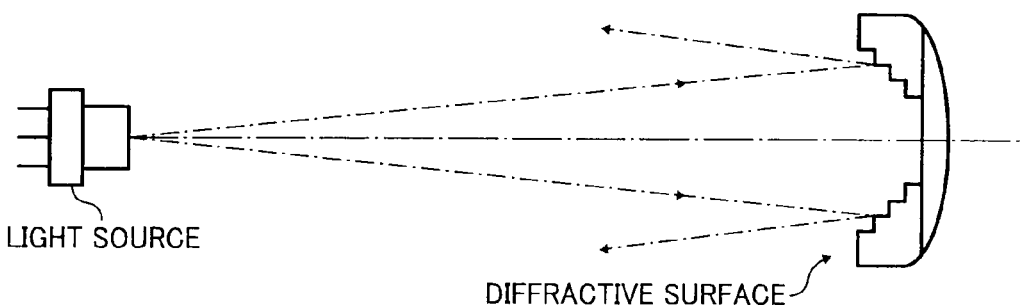

Because the multi-step diffractive surface is provided in the entrance surface side of the coupling lens 2 in the first embodiment, as shown in FIG. 6B, as an example, the light reflected from the multi-step diffractive surface becomes divergent light, which may not cause an output in the light source 1 to be unstable.

Next, the case in which the multi-step diffractive surface of the coupling lens 2 is elliptical is explained below. The coupling lens 2 is a hybrid lens of which a focus length is 15 millimeters, and the refractive surface of the coupling lens 2 is a rotational aspherical surface of which a curvature radius is −8.7 millimeters. The aspherical surface used here has the coefficients $A_4$, $A_6$, $A_8$, and $A_{10}$ in Equation (3) as follows: $A_4 = -1.0985 \times 10^{-4}$, $A_6 = -1.0427 \times 10^{-6}$, $A_8 = -2.4015 \times 10^{-8}$, and $A_{10} = +8.2391 \times 10^{-10}$.

The coupling lens 2 has the diffractive surface provided in the entrance surface and the refractive surface provided in the exit surface. A phase function W(Y, Z) of the first surface is expressed by following Equation (5) where Y is a distance from the optical axis in the main-scanning direction in a plane perpendicular to the optical axis, and Z is a distance in the sub-scanning direction. It is noted that a point on the optical axis is set as (Y, Z)=(0,0)

$$W(Y,Z) = C_y \cdot Y^2 + C_z \cdot Z^2 \quad (5)$$

The multi-step diffractive surface is provided in both the main-scanning direction and the sub-scanning direction so as to have an effect of temperature compensation in the first embodiment. In this case, coefficients $C_y$ and $C_z$ in Equation (5) are as follows: $C_y = -1.361 \times 10^{-3}$, and $C_z = -3.038 \times 10^{-2}$.

The second surface is a paraboloidal surface in which a curvature radius ($R_y$) in a direction corresponding to the main-scanning direction and a curvature radius ($R_z$) in a direction corresponding to the sub-scanning direction are mutually different from each other. Here, as an example, $R_y = -190$ millimeters, and $R_z = -9.5$ millimeters.

A plurality of diffractive grooves in the diffractive surface of the coupling lens 2 are elliptical steps around the optical axis. Specifically, a plurality of elliptical diffraction grooves are formed in the diffractive surface of the coupling lens 2 in a multi-step form.

Table 9 shows average amounts of change in the image locations at respective image heights of the hybrid lens having the multi-step diffractive surface of which diffraction groves are elliptical upon temperature changes from 10° C. to 45° C. and from 10° C. to 60° C.

TABLE 9

|  | Main-scanning direction | Sub-scanning direction |
|---|---|---|
| 10° C.→45° C. | 0.03 [mm] | 0.01 [mm] |
| 10° C.→60° C. | 0.07 [mm] | 0.03 [mm] |

Referring to Table 9, each amount of change in the image locations is 0.1 millimeter or less in both the main-scanning direction and the sub-scanning direction, and thus, it is understood that temperature compensation is satisfactorily achieved.

Next, a hybrid lens having the multi-step diffractive surface of which diffraction groves are elliptical according to a second embodiment of the present invention is explained below. In the hybrid lens having the multi-step diffractive surface of which diffraction groves are elliptical used in the second embodiment, the coefficients $C_y$ and $C_z$ in Equation (5) are as follows: $C_y = -8.28864 \times 10^{-4}$, and $C_z = -3.62628 \times 10^{-3}$.

Specifically, an ellipticity ($C_y/C_z$) is 4.38, which ensures easy machining and low cost. If the ellipticity ($C_y/C_z$) is higher than 5.5, this causes difficulty in machining and an increase in cost. Therefore, it is desirable that the ellipticity ($C_y/C_z$) is 5.5 or less in terms of the easy machining and the cost problem.

The second surface is a paraboloidal surface in which a curvature radius ($R_y$) in a direction corresponding to the main-scanning direction and a curvature radius ($R_z$) in a direction corresponding to the sub-scanning direction are mutually different from each other. Here, as an example, these curvature radii are set as $R_y = -350$ millimeters and $R_z = -80$ millimeters.

A refractive index of the lens, a shape of the lens, and an oscillation wavelength of the laser diode change as the temperature changes, which causes displacement in an image location. A second curvature radius (diffraction power) is designed so as to reduce the displacement. The scanning optical system used in an image forming apparatus according to the second embodiment is provided with an anamorphic optical system in which magnifications of the optical systems in a direction corresponding to the main-scanning direction and in a direction corresponding to the sub-scanning direction are different from each other. Therefore, if the displacement of the image location caused by the temperature change is corrected in the diffractive optical element, required diffraction power in a direction corresponding to the main-scanning direction is different from that in a direction corresponding to the sub-scanning direction.

FIG. 7A represents a relationship between a curvature radius of the second surface and the number of steps required for the multi-step diffractive surface. As shown in this figure, the number of steps exponentially increases with a decrease in the curvature radius of the second surface.

FIG. 7B represents a relationship between the curvature radius of the second surface and a displacement of the image location caused by the temperature change (25° C.→45° C.), related to a direction corresponding to the main-scanning direction. It is noted that the displacement of the image location when the diffractive surface is not provided is set to 1. It is understood that the displacement of the image location caused by the temperature change is satisfactorily corrected when the curvature radius of a substrate (second surface) is 350 millimeters. The number of steps at this time is about 11 steps.

FIG. 7C represents a relationship between the curvature radius of the second surface and a displacement of the image location caused by the temperature change (25° C.→45° C.), related to a direction corresponding to the sub-scanning direction. It is noted that the displacement of the image location when the diffractive surface is not provided is set to 1. It is understood that the displacement of the image location caused by the temperature change is satisfactorily corrected when the curvature radius of the substrate is 9 millimeters. The number of steps at this time is 300 steps or more, which causes machining to become considerably difficult.

FIG. 7D represents a relationship between the curvature radius of the second surface and a displacement of the image location caused by wavelength change (655 nanometers→665 nanometers), related to a direction corresponding to the sub-scanning direction. It is noted that the displacement of the image location when the diffractive surface is not provided is set to 1. It is understood that the displacement of the image location caused by the wavelength change is satisfactorily corrected when the curvature radius of the substrate is 80 millimeters. The number of steps at this time is about 50 steps.

A step and a pitch of the multi-step form (see FIG. 2) and the number of steps are specifically explained below. The step in the multi-step diffractive surface in the second embodiment is 1.266 micrometers. In the direction corresponding to the main-scanning direction, a minimum pitch (outermost zone width) is 176.9 micrometers, and the number of steps is 11, while in the direction corresponding to the sub-scanning direction, a minimum pitch (outermost zone width) is 40.2 micrometers, and the number of steps is 49.

As for the direction corresponding to the main-scanning direction, the second embodiment provides an effect of correcting the displacement of the image location caused by the temperature change, namely, an effect of correcting the displacement of the image location due to the change in the refractive index caused by change in volume of the lens arising from the temperature change and due to the wavelength change caused by the temperature change. As for the direction corresponding to the sub-scanning direction, the second embodiment provides an effect of correcting the displacement of the image location due to the wavelength change which is not caused by the temperature change. Thus, the number of steps required for the diffractive surface in the direction corresponding to the sub-scanning direction is largely reduced. In this case, satisfactory machining can be achieved. This enables a difficulty level of machining and optical performance to be balanced with the cost. Namely, it is possible to improve optical performance while easy machining and low cost are ensured.

Next, a case in which the junction between the glass-lens base material and the resin layer of the coupling lens 2 has a curvature identical to that of the second surface is explained below. The coupling lens 2 is a hybrid lens of which a focus lens is 27 millimeters, and the refractive surface of the coupling lens 2 is a rotational aspherical surface of which a curvature radius is −15.6 millimeter. The aspherical surface used here has the coefficients $A_4$, $A_6$, $A_8$, and $A_{10}$ in Equation (3) as follows: $A_4=1.9481\times10^{-5}$, $A_6=4.4485\times10^{-8}$, $A_8=1.1673\times10^{-9}$, and $A_{10}=-2.1065\times10^{-11}$.

When compensation for the temperature change from a temperature of 25° C. to 45° C. is set, a phase function coefficient of the first surface expressed by Equation (4) is $C_H=-1.3612\times10^{-3}$. Further, the second surface is a paraboloidal surface in which a curvature radius ($R_y$) in a direction corresponding to the main-scanning direction and a curvature radius ($R_z$) in a direction corresponding to the sub-scanning direction are mutually identical to each other, that is, $R_y=R_z=-190$ millimeter.

At this time, the step in the multi-step diffractive surface is 1.266 millimeters, the minimum pitch (outermost zone width) is 80.6 millimeters, and the number of steps is 18.

The phase function coefficient of the multi-step diffractive surface required to correct the temperature change in the main-scanning direction of the hybrid lens according to the second embodiment is $C_H=-1.3612\times10^{-3}$, which is extremely small as compared with the resin lens. Therefore, only a small number of steps are required for the multi-step diffractive surface, which enables easy machining to be maintained. Moreover, because the phase function coefficient is small, the diffraction power also becomes low, and thus the robustness against the change in oscillation wavelength of the light source 1 which is not caused by temperature change is also high.

Figure 8:
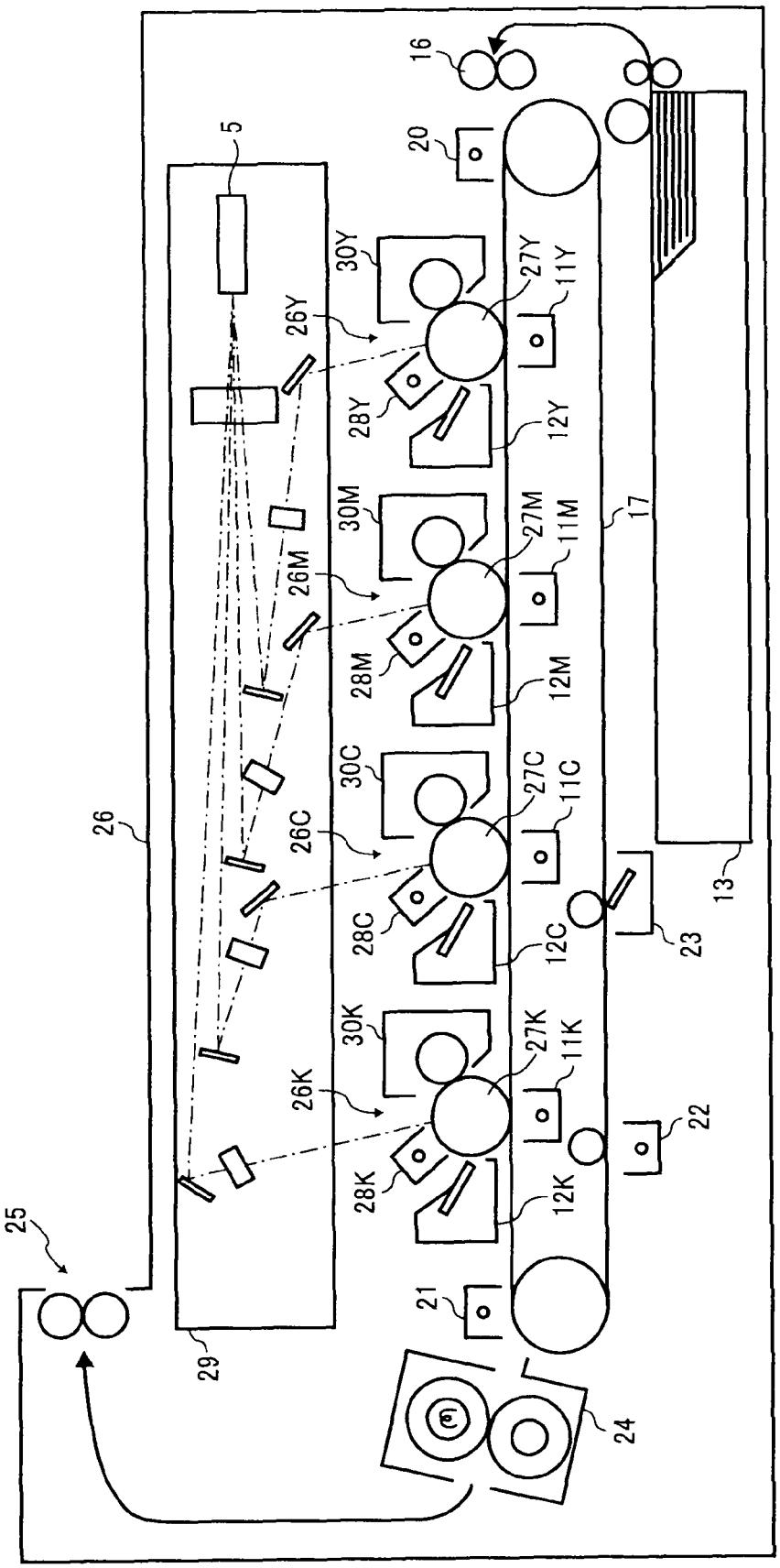
FIG. 8 is a schematic of a tandem color machine according to a third embodiment of the present invention.

FIG. 8 is a schematic of an example of an image forming apparatus according to a third embodiment of the present invention. The image forming apparatus is a tandem-type full-color optical printer. Provided in the lower part of the apparatus is a conveyor belt 17 for conveying a transfer paper (not shown) fed from a paper feeding cassette 13 that is placed in the horizontal direction. A photosensitive element 27Y for yellow, a photosensitive element 27M for magenta, a photosensitive element 27C for cyan, and a photosensitive element 27K for black are arranged at an equal space along the upper part of the conveyor belt 17 in this order from the upstream side. Hereafter, Y, M, C, and K in signs represent yellow, magenta, cyan, and black, respectively.

All the photosensitive elements 27Y, 27M, 27C, and 27K are formed so as to have the same diameter, and process units are sequentially arranged around each of the photosensitive elements according to electrophotographic process. Sequentially arranged around the photosensitive element 27Y, as an example, are a charging charger 28Y, an optical-scanning optical system 26Y of an optical scanning device 29, a developing unit 30Y, a transfer charger 11Y, and a cleaning unit 12Y. The same goes for the other photosensitive elements 27M, 27C, and 27K.

Specifically, in the image forming apparatus, the photosensitive elements 27Y, 27M, 27C, and 27K are surfaces to be scanned set for the colors, and the optical-scanning optical systems 26Y, 26M, 26C, and 26K of the optical scanning device 29 are arranged with respect to the photosensitive elements in one-to-one correspondence, respectively.

A registration roller 16 and a belt-charging charger 20 are arranged along the conveyor belt 17 in positions on the upstream side of the photosensitive element 27Y. Units such as a belt separation charger 21, a decharger 22, and a cleaning unit 23 are disposed in positions on the downstream side of the photosensitive element 27K. A fixing unit 24 is provided on the downstream side of the belt separation charger 21 in a paper conveying direction. The fixing unit 24 is connected to a paper ejection roller 25 towards a paper ejection tray 26.

In such a configuration, if a full color mode is effected, the optical-scanning optical systems 26Y, 26M, 26C, and 26K of the optical scanning device 29 carry out optical scanning on the photosensitive elements 27Y, 27M, 27C, and 27K respectively based on image signals for the colors Y, M, C, and K, and electrostatic latent images are formed on the photosensitive elements respectively. The electrostatic latent images are developed by toner of the colors corresponding to the images to form toner images. The toner images are electrostatically attracted to the conveyor belt 17 and superimposed on top of another by transferring one after another on a transfer paper to be conveyed. The superimposed images are fixed on the transfer paper by the fixing unit 24 to be a full color image, and the transfer paper with the image is ejected onto the paper ejection tray 26.

According to this configuration, at least one optical scanning device according to the first or the second embodiment is provided, and this enables high-quality images to be stably formed without causing cost increase even if environment fluctuation and unexpected fluctuation of oscillation wavelength in the light source arise.

In the optical scanning device according to the embodiment, the pre-deflector optical system includes at least one diffractive optical element, and the at least one diffractive optical element (or diffraction grating) is the hybrid lens in which the resin layer is joined to the glass-lens base material. The diffractive surface has the multi-step form that includes a plurality of zonal surfaces substantially perpendicular to the optical axis and a plurality of step surfaces each adjacent to the zonal surfaces, and the multi-step diffractive surface is formed in the resin layer. Therefore, high-quality images can be stably formed while easy manufacturing and low cost are ensured even if environment fluctuation and unexpected fluctuation of oscillation wavelength in the light source 1 arise. Moreover, the image forming apparatus according to the third embodiment includes at least the one optical scanning device, and this enables high-quality images to be stably formed without causing cost increase even if environment fluctuation and unexpected fluctuation of oscillation wavelength in the light source 1 arise.

According to the present invention, the optical performance can be improved while the easy manufacturing and the low cost are ensured.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
   a light source;
   a pre-deflector optical system that is arranged in an optical path of a light flux emitted from the light source and includes at least one diffractive optical element;
   a deflector that deflects the light flux passing through the pre-deflector optical system; and
   a scanning optical system that focuses the light flux deflected by the deflector on a surface to be scanned, wherein
   the diffractive optical element is obtained by joining a resin layer to a glass-lens base material,
   a diffractive surface of the diffractive optical element has a multi-step structure including a plurality of zonal surfaces substantially perpendicular to an optical axis and a plurality of step surfaces, and
   the diffractive surface is formed in the resin layer,
   wherein a junction between the glass-lens base material and the resin layer is formed into a flat shape, and
   wherein the diffractive surface has no power at room temperature.

2. The optical scanning device according to claim 1, wherein a refractive surface is provided in the glass-lens base material, and the refractive surface has an aspheric form.

3. The optical scanning device according to claim 1, wherein an angle between an arbitrary one of the zonal surfaces and a step surface adjacent to the zonal surface in a cross sectional shape including the optical axis of the diffractive surface is an obtuse angle.

4. The optical scanning device according to claim 1, wherein the diffractive surface is provided in an entrance surface or in an exit surface, wherever a divergence of the light flux reflected is higher.

5. The optical scanning device according to claim 1, wherein the diffractive surface is a surface in which a first surface having a diffraction effect and a second surface having a refraction effect which are joined, and power of the first surface and power of the second surface are mutually cancelled out.

6. The optical scanning device according to claim 1, wherein the diffractive optical element is used for a coupling lens that collects light beams emitted from the light source.

7. The optical scanning device according to claim 1, wherein the zonal surfaces are elliptical or circular.

8. The optical scanning device according to claim 1, wherein the light source includes a plurality of light emitting portions, and a surface to be scanned is simultaneously scanned with light beams that are emitted from the light emitting portions and deflected by one deflective facet of the deflector.

9. The optical scanning device according to claim 1, wherein the light source includes a vertical-cavity surface-emitting laser array having a plurality of light emitting portions.

10. An image forming apparatus comprising:
    at least one image carrier; and
    at least one optical scanning device to scan the image carrier with a light flux to form an image on the image carrier, the optical scanning device including
    a light source;
    a pre-deflector optical system that is arranged in an optical path of a light flux emitted from the light source and includes at least one diffractive optical element;
    a deflector that deflects the light flux passing through the pre-deflector optical system; and
    a scanning optical system that focuses the light flux deflected by the deflector on a surface to be scanned, wherein the diffractive optical element is obtained by joining a resin layer to a glass-lens base material,
a diffractive surface of the diffractive optical element has a multi-step structure including a plurality of zonal surfaces substantially perpendicular to an optical axis and a plurality of step surfaces, and
the diffractive surface is formed in the resin layer, wherein a junction between the glass-lens base material and the resin layer is formed into a flat shape, and wherein the diffractive surface has no power at room temperature.

11. The image forming apparatus according to claim 10, wherein the image information is color image information.

* * * * *